(12) United States Patent
Donovan et al.

(10) Patent No.: US 7,021,728 B2
(45) Date of Patent: Apr. 4, 2006

(54) HINGE MECHANISM FOR A MONITOR OF AN OVERHEAD CONSOLE

(75) Inventors: Jeffrey M. Donovan, St. Clair Shores, MI (US); James L. Quinno, Saline, MI (US); Sachin Shah, Troy, MI (US)

(73) Assignee: Lear Corporation, Southfield, MI (US)

( * ) Notice: Subject to any disclaimer, the term of this patent is extended or adjusted under 35 U.S.C. 154(b) by 470 days.

(21) Appl. No.: 10/350,500

(22) Filed: Jan. 24, 2003

(65) Prior Publication Data

US 2004/0041499 A1 Mar. 4, 2004

Related U.S. Application Data

(60) Provisional application No. 60/408,238, filed on Sep. 4, 2002.

(51) Int. Cl.
*A47B 81/06* (2006.01)
*A47B 5/00* (2006.01)

(52) U.S. Cl. .......... 312/7.2; 312/248; 348/837; 296/37.5; 296/37.8; 16/358

(58) Field of Classification Search ........... 312/7.2, 312/223.1, 245, 248; 16/358, 359, 361, 286, 16/277; 348/837; 296/37.5, 37.8
See application file for complete search history.

(56) References Cited

U.S. PATENT DOCUMENTS

| 4,530,412 A | * | 7/1985 | Sigety, Jr. .................. 16/361 |
| 4,953,259 A | | 9/1990 | Frye et al. |
| 5,172,969 A | * | 12/1992 | Reuter et al. ............ 16/358 X |
| 5,410,447 A | | 4/1995 | Miyagawa et al. |
| 5,535,482 A | * | 7/1996 | Grabber ..................... 16/286 |
| 6,018,847 A | | 2/2000 | Lu |
| 6,125,030 A | * | 9/2000 | Mola et al. ............ 296/37.8 X |
| 6,401,299 B1 | * | 6/2002 | Schwarz .................. 16/361 X |

FOREIGN PATENT DOCUMENTS

| DE | 42 12 181 | 10/1993 |
| DE | 299 22 839 | 3/2000 |
| DE | 696 08 858 | 6/2000 |

* cited by examiner

*Primary Examiner*—Anthony D. Barfield
(74) *Attorney, Agent, or Firm*—MacMillan, Sobanski & Todd, LLC

(57) ABSTRACT

The hinge assembly includes a housing and a monitor bezel for supporting a video monitor. The bezel is pivotally mounted on the housing about a pivot axis. A friction member is attached to one of the housing and the bezel and positioned and in sliding contact with a contact surface of the other of the housing and the bezel. The friction member is radially spaced apart from the pivot axis. A bias member biases the friction member against the contact surface. The pivoting of the bezel about the pivot axis causes the friction member to slide along the contact surface.

20 Claims, 7 Drawing Sheets

HINGE MECHANISM FOR A MONITOR OF AN OVERHEAD CONSOLE

CROSS REFERENCE TO RELATED APPLICATIONS

This application claims the benefit of U.S. Provisional Application No. 60/408,238 filed Sep. 4, 2002.

BACKGROUND OF THE INVENTION

This invention relates in general to overhead entertainment systems for vehicles, and in particular to a hinge assembly for a pivoting video monitor.

Many passenger vehicles now include overhead consoles mounted on the interior roof of the vehicle. Typically, the overhead console is mounted about the central longitudinal axis of the roof and positioned above the front passenger seating area. The overhead consoles can include a variety of compartments and components. For example, overhead consoles can include customized storage compartments for sunglasses, garage door openers, and coins. It is also known to provide various components such as lights, universal transceivers for garage door openers and security systems, computer displays for temperature, compass, trip and mileage readings, and conversational rear view mirrors.

It is also known to mount entertainment systems within an overhead console. Commonly, these entertainment systems include a relatively flat video display or monitor which is connected to a video transmitter device for displaying the video image. The video transmitter device can be a video cassette recorder/player (VCR), a digital video disc recorder/player (DVD), electronic game module, and/or a television tuner. Commonly, the monitor is pivotally mounted on the overhead console and is movable between a generally horizontal storage position flush against a bottom surface or recess of the console to a generally vertical or angled deployed viewing position. Conventional hinge mechanisms often do not adequately support the monitor at a desired viewing deployed position such that over time the monitor well move from its desired deployed position, either due to gravity of vibrational forces.

BRIEF SUMMARY OF THE INVENTION

This invention relates to an overhead entertainment system for vehicles, and in particular to an improved hinge assembly for a pivoting and maintaining a video monitor between a stored position and a deployed position.

The hinge assembly includes a housing and a monitor bezel for supporting a video monitor. The bezel is pivotally mounted on the housing about a pivot axis. A friction member is attached to one of the housing and the bezel and positioned and in sliding contact with a contact surface of the other of the housing and the bezel. The friction member is radially spaced apart from the pivot axis. A bias member biases the friction member against the contact surface. The pivoting of the bezel about the pivot axis causes the friction member to slide along the contact surface.

Various objects and advantages of this invention will become apparent to those skilled in the art from the following detailed description of the preferred embodiment, when read in light of the accompanying drawings.

DETAILED DESCRIPTION OF THE INVENTION

Figure 1:
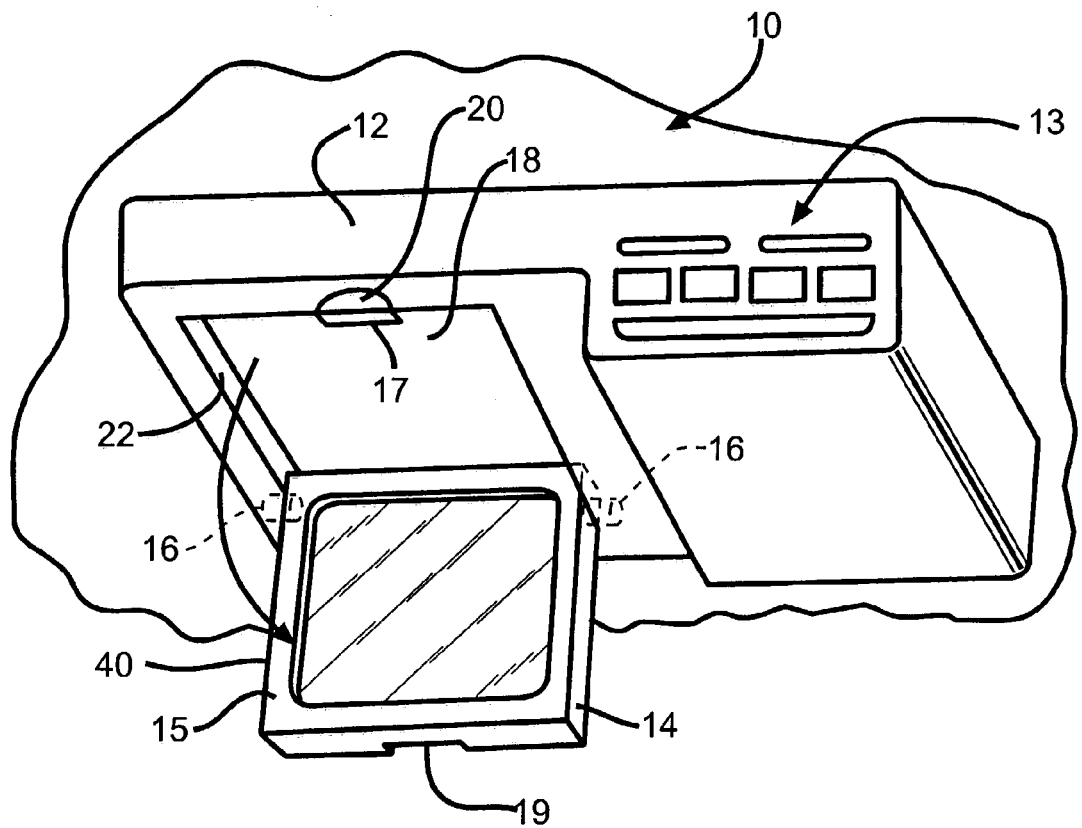
FIG. 1 is a perspective view of an overhead entertainment system having a hinge assembly in accordance with the present invention.

Referring now to the drawings, there is illustrated in FIG. 1 an overhead console entertainment system, indicated generally at 10. Although the system 10 is preferably mounted on the roof of a vehicle, the hinge assembly of the present invention can be used for any movable display unit mounted at any position.

The system 10 includes a housing 12 which can be made of any suitably rigid material such as a polymeric material. The housing 12 is operatively mounted to the roof of the vehicle. The system 10 can include any desired entertainment or display device, such as a digital video disc recorder/player (DVD) 13, a video cassette recorder/player (VCR), electronic game module, and/or television tuner. The system 10 can also include input jacks for inputting a video and/or audio signal from a video/audio source not mounted on the console.

Figure 7:
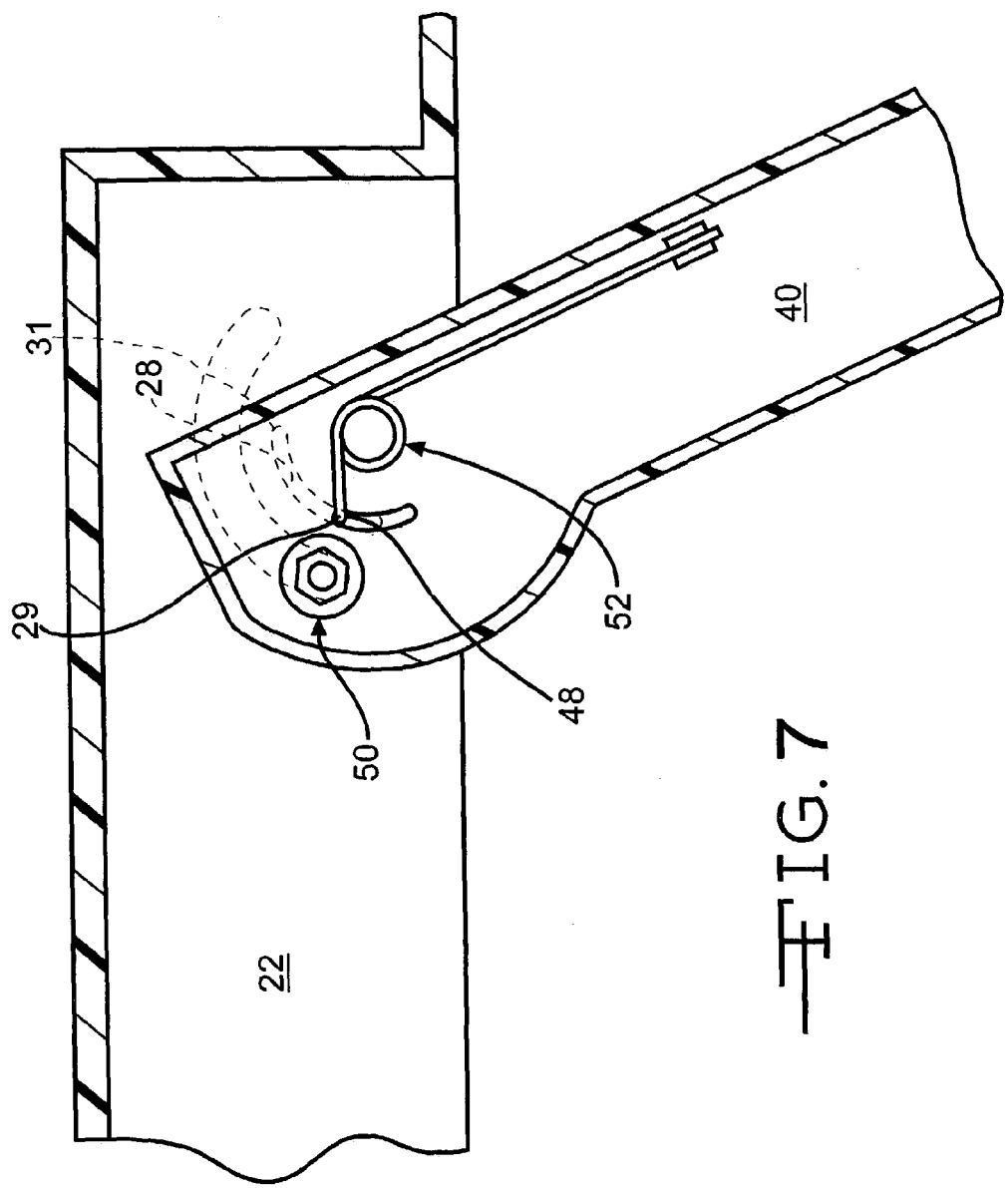
FIG. 7 is a view similar to FIG. 3, wherein the monitor is at a deployed position.

The system 10 also includes a video screen or monitor 14 which is pivotally attached to the housing 12 by at least one but preferably by a pair of hinge assemblies, indicated generally at 16, in accordance with the present invention. The monitor 14 can be pivoted downward from a generally horizontal stored position within a recess 18 formed in the housing 12 to any suitable deployed angled position, as shown in FIGS. 1 and 7. As will be discussed in detail below, the hinge assembly 16 enables the monitor 14 to be moved between the stored and deployed positions as well as frictionally maintaining the monitor 14 at a desired deployed position.

Preferably, the system 10 includes a releasable latch 20 for securing the monitor 14 in its stored position. The latch 20 can include a manually operated movable latch arm 17 which selectively engages an aperture or hook portion 19 formed on the monitor 14. Of course, any suitable manually operated or electrically actuated latch mechanism may be used.

The display screen or monitor 14 is housed in a bezel housing 15 pivotally attached to the housing 12 by the hinge assemblies 16. The housing 12 and the bezel housing 15 can be made of any suitably rigid material, such as a polymeric material.

Although the system 10 preferably includes a pair of hinge assemblies 16 mounted on each lateral side of the bezel housing 15 as schematically shown in FIG. 1, for clarity only one hinge assembly 16 will be described and shown in detail. It should be understood that the other hinge assembly is structured similarly and functions in a similar manner.

Figure 2:
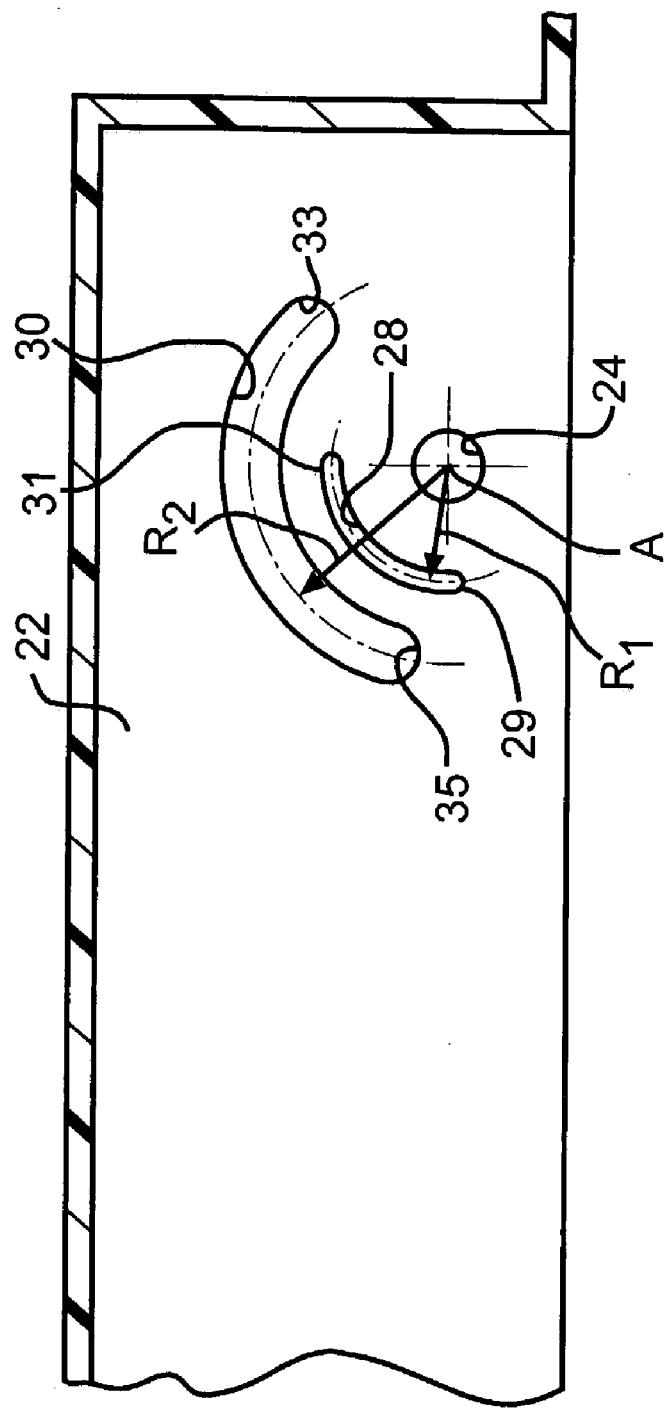
FIG. 2 is a side elevational view of a side wall of the housing of the system of FIG. 1.

As best shown in FIG. 2, the recess 18 of the housing 12 defines a generally vertical side wall 22 of the housing 12. The side wall 22 includes a hole 24 formed therein for receiving a pivot pin 25 for pivotally attaching the monitor 14 to the housing 12. The hole 24 and pivot pin 25 define a laterally extending pivot axis A. The side wall 22 also includes an arcuate slot 28 for receiving a tang 82 of a spring 80, as will be discussed in greater detail below. Preferably, the arcuate slot 28 has a semi-circular shape defined by a radius $R_1$ originating from the pivot axis A. The slot 28 has ends 29 and 31. The side wall 22 also includes a larger arcuate slot 30 preferably having a semi-circular shape defined by a radius $R_2$ originating from the pivot axis A. The slot 30 has ends 33 and 35.

Figure 3:
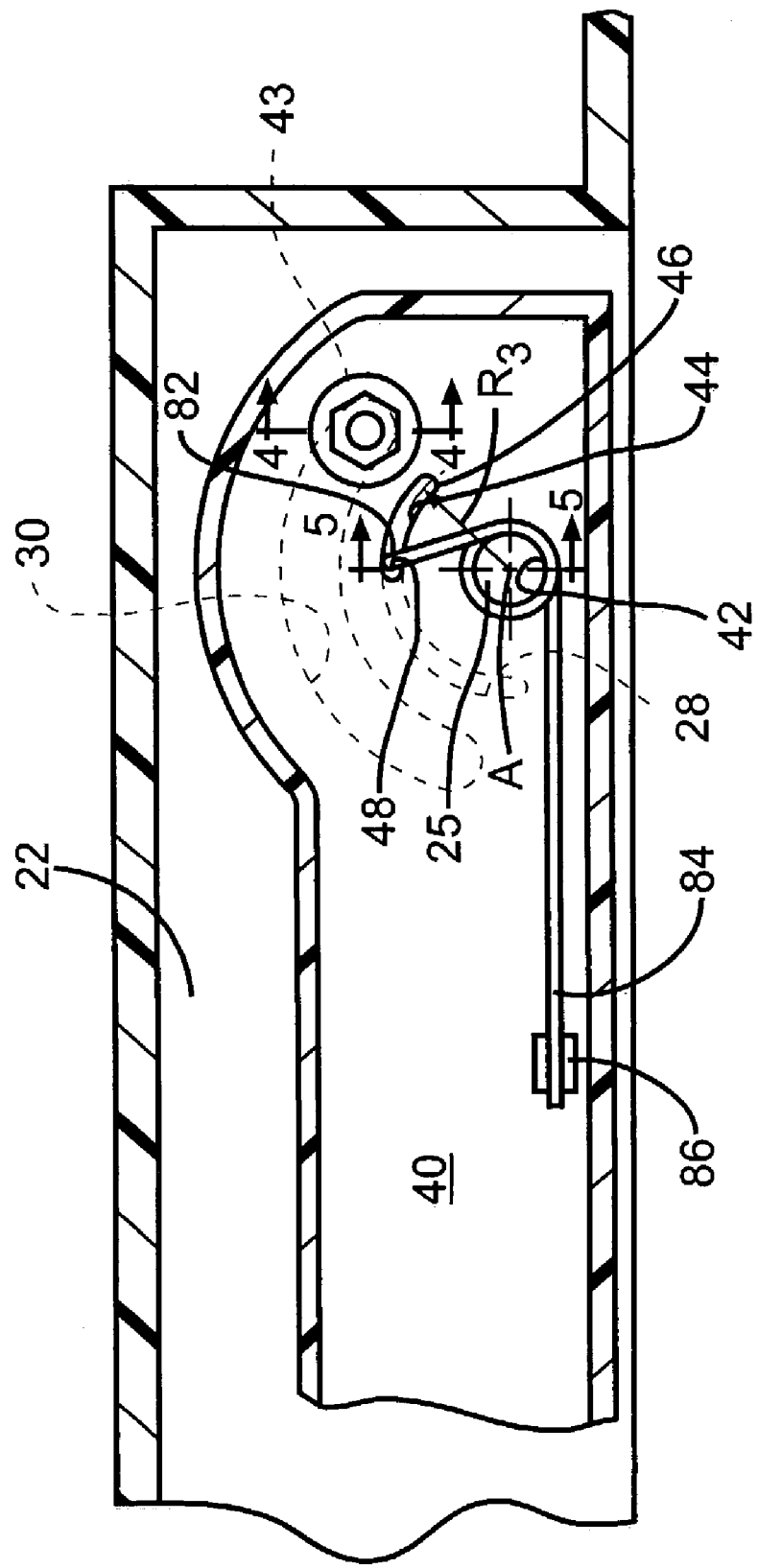
FIG. 3 is a cross-sectional view of the monitor bezel adjacent the side wall of the housing when the monitor is in its stored position.
Figure 4:
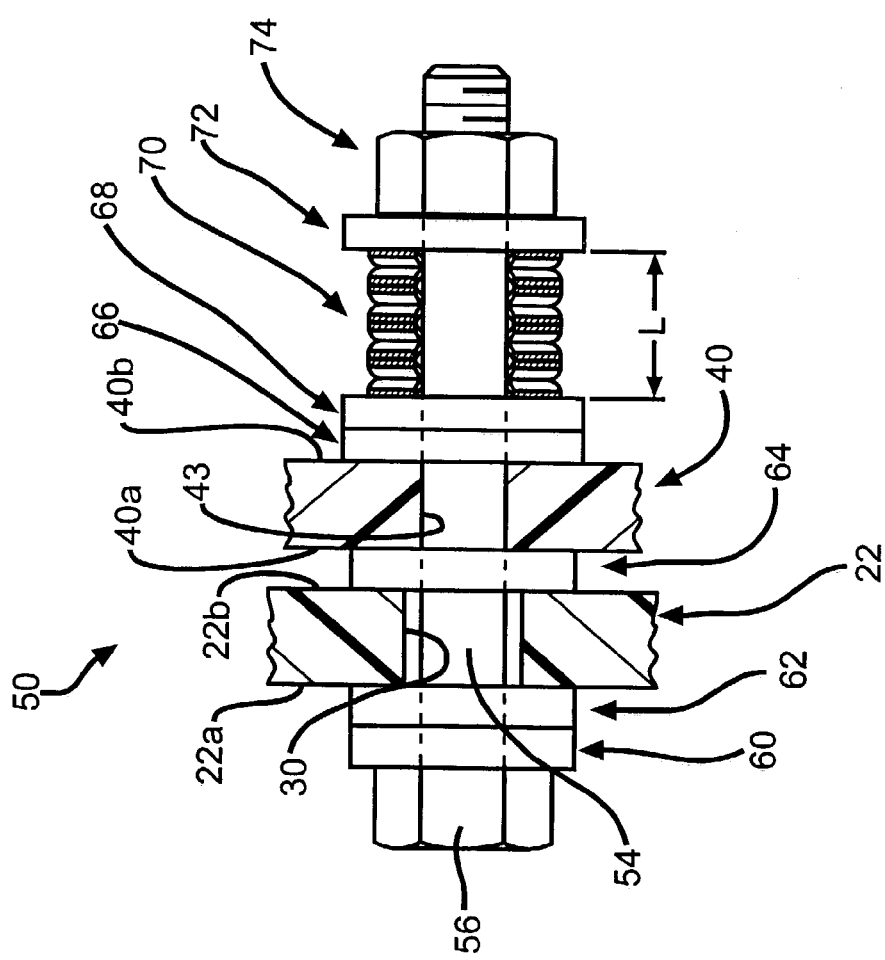
FIG. 4 is a cross-sectional view of a slide assembly taken along lines 4—4 in FIG. 3.

The bezel housing 15 includes a side wall 40 positioned adjacent to but spaced from the side wall 22 when the monitor 14 is in its stored position. As best shown in FIG. 3, the side wall 40 includes a hole 42 for receiving the pivot pin 25. The hole 42 is coaxial with the hole 24 formed in the side wall 22. The side wall 40 also includes a hole 43, as best shown in FIG. 4, for receiving a bolt 54 as discussed in further detail below. The side wall 22 also includes an arcuate slot 44 for receiving the tang 82 of the spring 80. Preferably, the arcuate slot 44 has a semi-circular shape defined by a radius $R_3$ originating from the pivot axis A. Preferably, the radius $R_3$ is generally equal to the radius $R_1$ such that the slots 28 and 44 are arcuately aligned with one another. The slot 42 has ends 46 and 48. Note that the slot 28 of the housing 12 and the slot 44 of the bezel are not in overlapping alignment in FIG. 3 when the monitor is in its stored position.

Figure 5:
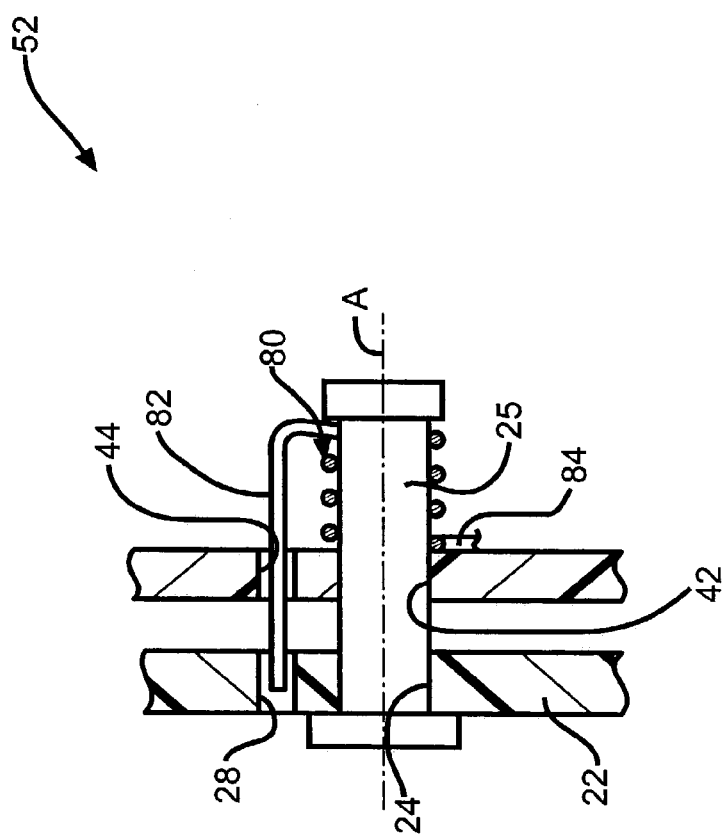
FIG. 5 is a cross-sectional view of a pivot assembly taken along lines 5—5 in FIG. 3.

The hinge assembly 16 preferably includes a slide assembly 50, as shown in FIG. 4, and a pivot assembly 52, as shown in FIG. 5. Generally, the pivot assembly 52 provides a pivoting connection between the housing 12 and the bezel housing 15 of the monitor 14, while the slide assembly 50 provides frictional engagement to maintain the monitor at a desired deployed position.

The slide assembly 50 includes a central pin or partially threaded bolt 54 having an enlarged head 56. The bolt 54 is disposed through the slot 30 of the side wall 22 of the housing 12. The bolt 54 is also disposed through the hole 42 of the side wall 40 of the bezel housing 15. The slide assembly 50 preferably further includes a washer 60, a first washer 62, a second washer 64, a third washer 66, a washer 68, a spring assembly 70, a washer 72 and a nut 74 threadably engaged with the end of the bolt 54. The spring assembly 70 is illustrated as a plurality of wave springs disposed between the washers 68 and 72.

The first washer 62 abuts a first side 22a of the side wall 22 to define a pair of mating first contact surfaces. The second washer 64 is deposed between a second side 22b of the side wall 22 and a first surface 40a of the side wall 40 to define a pair of mating second surfaces. The third washer 66 abuts a second side 40b of the side wall 40 to define a pair of mating second contact surfaces. The contact surfaces frictionally engage one another to maintain the monitor 14 at its desired deployed position. When the monitor 14 is manually pivoted relative to the housing 12, one or more of the pairs of contact surfaces slide relative to one another.

The use of the washers 62, 64, and 66 helps improve the wear characteristics of the hinge assembly 16, as well as helps reduce squeaks. The material of the washers is preferably selected to accurately predict and control the frictional engagement on the contacting components of the slide assembly 50. It has been found that washers 62, 64, and 66 made of a polymeric material, such as nylon, is well suited for reducing wear and noise, as well as having desired frictional characteristics. The bolt 54, the washers 60 and 72, and the nut 74 may be formed of a metallic material, such as steel.

The spring 70 assembly can by any suitable spring structure or plurality of spring structures for generating a force which is exerted on the slide assembly 16 to bias the washers 62, 64, 66 against their respective contact surfaces of the side walls 22 and 40 or washers 60 and 68. Thus, the spring assembly 70 as shown in FIG. 4 is loaded to exert a force to bias the washers 68 and 72 away from each other, thereby exerting a force to compress the head 56, the washers 60, 62, 64, 66, and the side walls 22 and 40 against one another. This compressive force provides the frictional engagement between the pairs of mating contact surfaces described above. Examples of suitable spring structures for the spring assembly 70 include compression springs, wave washers, wave springs, and Belleville washers/springs. The position of the nut 74 and the spring force of the spring 70 correspond to the frictional contact force between the mating contact surfaces. Thus, the slide assembly 50 is adjustable to alter the force exerted by the spring assembly 70 by changing the position of the nut 74 relative to the bolt 54 to effect the axial length L of the spring assembly 70.

The pivot assembly 52 includes the pin 25 and a torsional coil spring 80 having a first tang 82 and a second tang 84. The first tang 82 extends though the slots 28 and 44. The second tang 84 is attached or engaged with the bezel housing 15 by a clip 86 attached to the side wall 40. The clip 86 is preferably spaced a relatively long distance from the pivot axis A to increase the length of the moment arm the tang 84 exerts on the bezel to move the monitor 14, thereby reducing the required spring force to overcome the frictional engagement of the components of the slide assembly 50.

The spring 80 is loaded in the position shown in FIG. 3 such that the tang 82 exerts a force against the end 31 of the slot 29, and the tang 84 exerts a downward force on the clip 86. Thus, the spring 80 biases the monitor in a counter-clockwise position, as viewing FIG. 3, out of its stored position. However, the locking engagement of the latch 20 prevents the spring 80 from moving the monitor 14 from out of its stored position.

Figure 6:
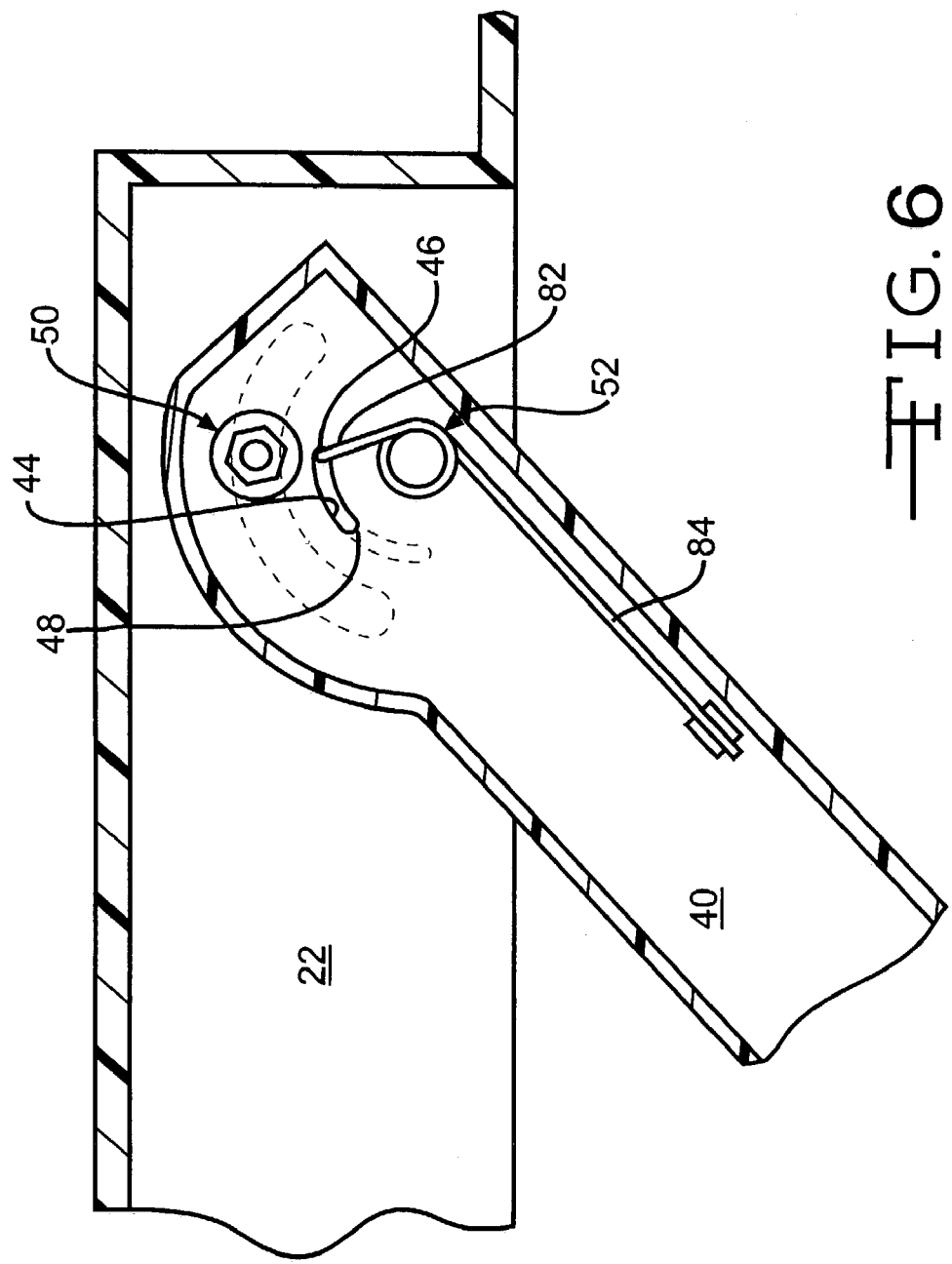
FIG. 6 is a view similar to FIG. 3, wherein the monitor is at an intermediate position.

To move the monitor 14 from its stored position to its deployed position, the latch 20 is operated to release the latch arm 17 from the hook portion 19. Upon the release actuation of the latch 20, the force of the spring 80 will pivot the monitor 14 to an intermediate position, as shown in FIG. 6, which can be any suitable angle relative to the stored position, such as about 45 degrees, to aid the user in grasping and further positioning the monitor 14 at a desired viewing angle. Note that at the intermediate position, the bezel housing 15 has pivoted relative to the housing 12 such that the tang 82 has reached the end 46 of the slot 44. At this position, both of the tangs 82 and 84 exert a force on the side wall 40 of the bezel, and the spring 80 no longer serves a bias function upon further movement of the monitor 40. The spring 70 functions as a bias member biasing the monitor 14 from its stored position to the intermediate position. The frictional force exerted by the sliding assembly on the side wall 22 of the housing 12 will generally maintain the monitor at about its intermediate position. Note that the spring 80 has a spring force sufficient to overcome the frictional forces acting on the mating contact surfaces.

Once the monitor 14 is in its intermediate position, the user can then manually pivot the monitor 14 to a viewable deployed position, such as shown in FIG. 7. One or more of the washers 62, 64, and 66 rotationally slides relative to their adjacent components to provide a frictional holding force for the monitor 14 at any position beyond the intermediate position. The contact surfaces of the washers 62, 64, and 66 define a friction member having a surface radially spaced from the pivot axis A. It should be understood that other structures other than washers may be used to define frictional contact surfaces. Note that the tang 82 of the spring 80 is free to translate in the slot 28 of the housing 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A hinge assembly for a vehicle entertainment assembly comprising:
   a housing;
   a monitor bezel for supporting a video monitor, said bezel pivotally mounted on said housing about a pivot axis;
   a friction member attached to one of said housing and said bezel and positioned in sliding contact with a contact surface of the other of said housing and said bezel, said friction member being radially spaced apart from said pivot axis; and
   a bias member biasing said friction member against said contact surface, wherein pivoting of said bezel about said pivot axis causes said friction member to slide along said contact surface; and
   a spring biasing said bezel from a first position to a second position relative to said housing.

2. The assembly of claim 1, wherein said friction member and said bias member are mounted on a pin slidably disposed in an arcuate slot formed in said one of said housing and said bezel, and further including a washer disposed about said pin, said washer defining the friction member and having surfaces abutting said contact surface of said housing.

3. The assembly of claim 1, wherein said bias member is adjustable to alter the force exerted on said friction member.

4. The assembly of claim 1, wherein said spring is a wave spring.

5. The assembly of claim 1, wherein said spring is a coil spring.

6. The assembly of claim 5, wherein said bezel is pivotally mounted on said housing about a pivot pin extending along said pivot axis, and wherein said coil spring is disposed about said pin.

7. The assembly of claim 6, wherein said spring includes an end tang disposed in arcuate slots formed in said bezel and said housing.

8. The assembly of claim 1, wherein said bezel is movable to a third position such that said second spring does not exert a biasing force against said bezel and said housing.

9. An adjustable vehicle interior panel assembly comprising;
   a housing;
   a bezel pivotally mounted on said housing about a pivot axis, said bezel including an arcuate slot spaced from said pivot axis;
   a pivot assembly including a pin extending from one of said housing and said bezel along said pivot axis, said pin extending in a hole formed in the other of said housing and said bezel to provide a pivot attachment of said bezel relative to said housing;
   a slide assembly including a second pin extending from said bezel and disposed in said arcuate slot, said slide assembly further including a friction member connected to said second pin and positioned in sliding contact with a contact surface of said other of said housing and said bezel; and
   a bias member biasing said friction member against said contact surface in a direction parallel to said pivot axis.

10. The assembly of claim 9, wherein said bias member is adjustable to alter the force exerted on said friction member.

11. The assembly of claim 10, wherein said bias member is a spring.

12. The assembly of claim 9 further including a second spring biasing said bezel from a first position to a second position relative to said housing.

13. The assembly of claim 12, wherein said spring is a coil spring disposed about said pin.

14. The assembly of claim 13, wherein said spring includes an end tang disposed in arcuate slots formed in said bezel and said housing.

15. The assembly of claim 12, wherein said bezel is movable to a third position such that said second spring does not exert a biasing force against said bezel and said housing.

16. A vehicle entertainment assembly comprising:
   a housing having a recess;
   a bezel supporting a video monitor, said bezel pivotally mounted relative to said housing, said bezel movable between a stored position generally disposed in said recess, and an intermediate position such that said recess is at least partially exposed to enable a user to readily grasp and manually move said bezel to a selected deployed position for viewing said monitor;
   a friction member frictionally mounting said bezel relative to said housing such that said friction member holds said bezel at any position between said intermediate position and said deployed position;
   a latch for selectively securing said bezel in said stored position; and
   a spring which upon release of said latch automatically moves said bezel from said stored position to said intermediate position.

17. The assembly of claim 16, wherein frictional engagement caused by said friction member is in effect between said stored and deployed positions of said bezel, and wherein said spring overcomes a frictional force of said friction member when moving said bezel from said stored position to said intermediate position upon release of said latch.

18. The assembly of claim 16, wherein said spring does not exert a biasing force to assist movement of said bezel from said intermediate position to said deployed position.

19. The assembly of claim 18, wherein said bezel includes a first arcuate slot radially spaced from said pivot axis, and wherein said housing includes a second arcuate slot radially spaced from said pivot axis by the same distance as the first arcuate slot, said spring having a first portion connected to said bezel, and a second portion disposed in said first and second arcuate slots, and wherein when said bezel is between said stored and intermediate positions said second portion exerts a force against said housing, and when said bezel is between said intermediate and deployed positions said second portion exerts a force against said bezel.

20. The assembly of claim 16, wherein said bezel has a rear surface facing an interior of the vehicle when said bezel is in said stored position, and a front surface having said video monitor thereon facing said recess when said bezel is in said stored position, and wherein when said bezel is in said intermediate position the user can simultaneously grasp said front and rear surfaces to manually move said bezel to the selected deployed position for viewing the monitor.

* * * * *